(12) United States Patent
Lee et al.

(10) Patent No.: US 10,845,645 B2
(45) Date of Patent: Nov. 24, 2020

(54) DISPLAY DEVICE

(71) Applicant: LG ELECTRONICS INC., Seoul (KR)

(72) Inventors: Uihyung Lee, Seoul (KR); Minho Kim, Seoul (KR); Sujin Sim, Seoul (KR); Wondo Kee, Seoul (KR); Ilsang Yeon, Seoul (KR); Juyoung Joung, Seoul (KR); Manhyuck Han, Seoul (KR); Jongho Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 16/119,847

(22) Filed: Aug. 31, 2018

(65) Prior Publication Data

US 2019/0094622 A1    Mar. 28, 2019

Related U.S. Application Data

(60) Provisional application No. 62/563,575, filed on Sep. 26, 2017.

(30) Foreign Application Priority Data

Jan. 11, 2018    (KR) .......................... 10-2018-0004063

(51) Int. Cl.
*G02F 1/1335* (2006.01)
*G02F 1/13357* (2006.01)
(Continued)

(52) U.S. Cl.
CPC ..... *G02F 1/133608* (2013.01); *G02B 6/0031* (2013.01); *G02F 1/1345* (2013.01);
(Continued)

(58) Field of Classification Search
CPC ........ G02B 3/005; G02B 3/0056; G02B 3/04; G02B 19/0009; G02B 19/0061;
(Continued)

(56) References Cited

U.S. PATENT DOCUMENTS 9,360,186 B2 * 6/2016 Choi .......................... F21V 5/04
10,190,746 B1 * 1/2019 Mao ......................... F21V 23/04
(Continued)

FOREIGN PATENT DOCUMENTS

KR   10-2006-0084026 A   7/2006
KR   10-2008-0039825 A   5/2008
(Continued)

*Primary Examiner* — Hoan C Nguyen
(74) *Attorney, Agent, or Firm* — Birch, Stewart, Kolasch & Birch, LLP

(57) ABSTRACT

A display device is disclosed. The display device includes a display panel, a frame positioned in the rear of the display panel, a substrate positioned between the frame and the display panel, extended in an up-down direction of the frame, and mounted on the frame, a light source mounted on the substrate, and a lens covering the light source and mounted on the substrate. The lens includes a first stopper protruding and extending from a lower surface of the lens, and a first leg extended from the first stopper toward a lower part of the lens. The substrate includes a hole into which the first leg is inserted.

7 Claims, 23 Drawing Sheets

(51) Int. Cl.
*G02F 1/1345* (2006.01)
*F21V 8/00* (2006.01)
*G02F 1/1333* (2006.01)

(52) U.S. Cl.
CPC .. *G02F 1/133308* (2013.01); *G02F 1/133606*
(2013.01); *G02F 1/133615* (2013.01); *G02F 1/133603* (2013.01); *G02F 2001/133607*
(2013.01); *G02F 2201/46* (2013.01)

(58) Field of Classification Search
CPC ............. G02B 6/0031; G02F 1/133606; G02F 1/133308; G02F 1/133615; G02F 1/1345; G02F 2001/133603; G02F 2001/133607; G02F 1/133608; G02F 2201/46; G02F 1/133603; F21V 5/04; F21Y 2115/10
See application file for complete search history.

(56) References Cited

U.S. PATENT DOCUMENTS

| | | | | |
|---|---|---|---|---|
| 2006/0139918 | A1* | 6/2006 | Dolgin | G02B 3/00 362/232 |
| 2008/0100773 | A1* | 5/2008 | Hwang | G02B 3/005 349/62 |
| 2014/0168970 | A1* | 6/2014 | Choi | F21V 5/04 362/235 |
| 2015/0109559 | A1* | 4/2015 | Lee | G02F 1/133606 349/67 |
| 2015/0138759 | A1* | 5/2015 | Nameda | G02F 1/133603 362/97.2 |
| 2015/0276170 | A1* | 10/2015 | Motoyanagi | F21V 5/04 362/335 |

FOREIGN PATENT DOCUMENTS

| | | |
|---|---|---|
| KR | 10-2013-0064770 A | 6/2013 |
| KR | 10-2014-0034632 A | 3/2014 |
| KR | 10-1467638 B1 | 12/2014 |

* cited by examiner

DISPLAY DEVICE

This application claims the benefit of Korean Patent Application No. 10-2018-0004063 filed on Jan. 11, 2018, and U.S. provisional application 62/563,575 filed on Sep. 26, 2017, the entire contents of which are incorporated herein by reference for all purposes as if fully set forth herein.

BACKGROUND OF THE INVENTION

Field of the Invention

The present disclosure relates to a display device.

Discussion of the Related Art

With the development of the information society, various demands for display devices are increasing. Various display devices, such as liquid crystal displays (LCDs), plasma display panels (PDPs), electroluminescent displays (ELDs), and vacuum fluorescent displays (VFDs), have been recently studied and used in response to various demands for the display devices.

Among the display devices, a liquid crystal display panel of a liquid crystal display includes a liquid crystal layer and a thin film transistor (TFT) substrate and a color filter substrate that are positioned opposite each other with the liquid crystal layer interposed therebetween. The liquid crystal display panel displays an image using light provided by a backlight unit.

Recently, many studies have been conducted to improve light uniformity and reliability of a backlight unit. A lens may be positioned adjacent to a light source so that light provided by the light source is uniformly supplied to a display panel, and the lens may be fixed to a substrate, on which the light source is disposed, by an adhesive. After the adhesive is cured, the lens may be detached from the substrate by an external impact. Alternatively, an adhesive strength of the adhesive may be reduced by heat generated in the light source, and thus the lens may be detached from the substrate.

SUMMARY OF THE INVENTION

An object of the present disclosure is to address the above-described and other problems. Another object of the present disclosure is to improve reliability of a backlight unit.

Another object of the present disclosure is to improve durability of a fixing structure of a lens.

In one aspect of the present disclosure, there is provided a display device comprising a display panel, a frame positioned in the rear of the display panel, a substrate positioned between the frame and the display panel, extended in an up-down direction of the frame, and mounted on the frame, a light source mounted on the substrate, and a lens covering the light source and mounted on the substrate, wherein the lens includes a first stopper protruding and extending from a lower surface of the lens, and a first leg extended from the first stopper toward a lower part of the lens, wherein the substrate includes a hole into which the first leg is inserted.

According to another aspect of the present disclosure, a diameter of the first stopper may be greater than a diameter of the first leg.

According to another aspect of the present disclosure, a diameter of the first stopper may be greater than a diameter of the hole.

According to another aspect of the present disclosure, the lens may further include a second leg positioned adjacent to the first leg, and a length of the second leg may be substantially equal to a length of the first stopper.

According to another aspect of the present disclosure, the lens may further include a third leg and a fourth leg that respectively face the first leg and the second leg with respect to a center of a lower surface of the lens. The fourth leg may include a second stopper.

According to another aspect of the present disclosure, the first leg may face the third leg with respect to the center of the lower surface of the lens, and the second leg may face the fourth leg with respect to the center of the lower surface of the lens.

According to another aspect of the present disclosure, the first leg, the second leg, the third leg, and the fourth leg may entirely form a rectangle and may be respectively positioned at corners of the rectangle.

According to another aspect of the present disclosure, the display device may further comprise an adhesive between the first leg and the hole.

According to another aspect of the present disclosure, the adhesive may be formed around the first stopper.

According to another aspect of the present disclosure, the display device may further comprise an adhesive between the first leg and the hole, the adhesive being formed around the second leg.

According to another aspect of the present disclosure, the lens may further include a receiving groove formed at a center of the lens and accommodating the light source, a first lower surface formed on a perimeter of the receiving groove, and a second lower surface formed on a perimeter of the first lower surface. The first lower surface and the second lower surface may form a stepped portion.

According to another aspect of the present disclosure, the first stopper and the first leg may be formed on the second lower surface of the lens.

An effect of a display device according to the present disclosure is described as follows.

According to at least one aspect of the present disclosure, the present disclosure can improve reliability of a backlight unit.

According to at least one aspect of the present disclosure, the present disclosure can improve durability of a fixing structure of a lens.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

DETAILED DESCRIPTION OF THE EMBODIMENTS

Figure 1:
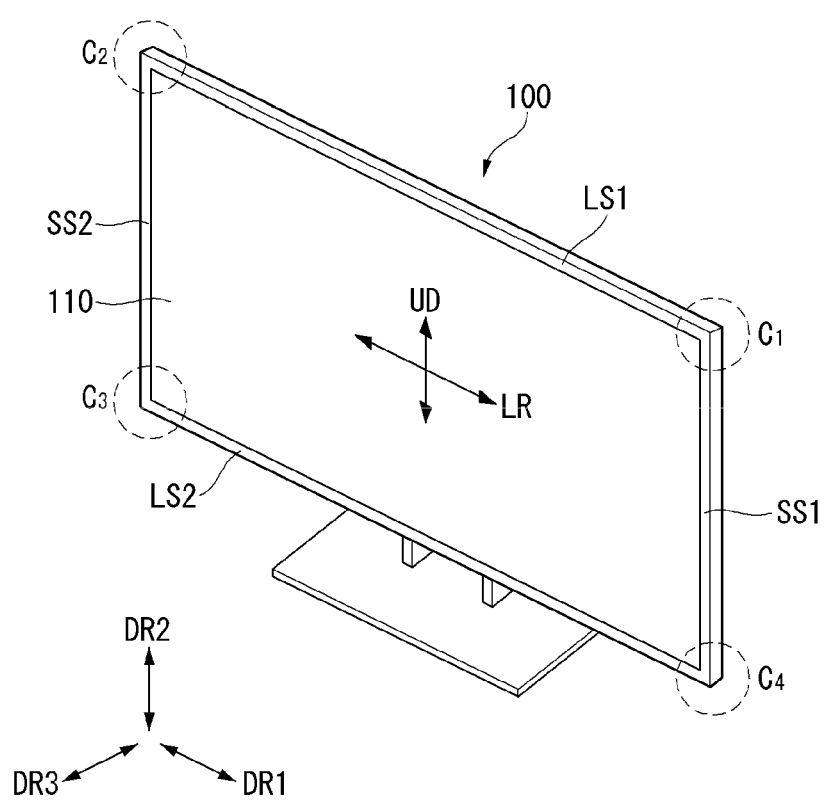
FIGS. 1 to 8 illustrate a display device related to the present disclosure.

Reference will now be made in detail embodiments of the disclosure examples of which are illustrated in the accompanying drawings. Since the present disclosure may be modified in various ways and may have various forms, specific embodiments are illustrated in the drawings and are described in detail in the present specification. However, it should be understood that the present disclosure are not limited to specific disclosed embodiments, but include all modifications, equivalents and substitutes included within the spirit and technical scope of the present disclosure.

The terms 'first', 'second', etc. may be used to describe various components, but the components are not limited by such terms. The terms are used only for the purpose of distinguishing one component from other components. For example, a first component may be designated as a second component without departing from the scope of the present disclosure. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present disclosure. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present disclosure pertains. The terms defined in a generally used dictionary must be understood to have meanings identical to those used in the context of a related art, and are not to be construed to have ideal or excessively formal meanings unless they are obviously specified in the present application.

The following exemplary embodiments of the present disclosure are provided to those skilled in the art in order to describe the present disclosure more completely. Accordingly, shapes and sizes of elements shown in the drawings may be exaggerated for clarity.

Hereinafter, embodiments of the disclosure are described using a liquid crystal display panel as an example of a display panel. However, embodiments are not limited thereto. For example, a plasma display panel (PDP), a field emission display (FED) panel, and an organic light emitting diode (OLED) display panel may be used.

In what follows, a display device may include a first long side LS1, a second long side LS2 opposite the first long side LS1, a first short side SS1 adjacent to the first long side LS1 and the second long side LS2, and a second short side SS2 opposite the first short side SS1.

In embodiments disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

Embodiments of the disclosure describe that lengths of the first and second long sides LS1 and LS2 are longer than lengths of the first and second short sides SS1 and SS2 for convenience of explanation. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display device, and a second direction DR2 may be a direction parallel to the short sides SS1 and SS2 of the display device. Further, a third direction DR3 may be a direction vertical to the first direction DR1 and/or the second direction DR2.

In embodiments disclosed herein, the first direction DR1 and the second direction DR2 may be commonly referred to as a horizontal direction. Further, the third direction DR3 may be referred to as a vertical direction.

In embodiments disclosed herein, a side or a surface, on which the display device displays an image, may be referred to as a front side or a front surface. When the display device displays the image, a side or a surface, at which the image cannot be observed, may be referred to as a rear side or a rear surface. When the display device is observed at the front side or the front surface, the first long side LS1 may be referred to as an upper side or an upper surface. In the same manner as the first long side LS1, the second long side LS2 may be referred to as a lower side or a lower surface. Further, the first short side SS1 may be referred to as a right side or a right surface, and the second short side SS2 may be referred to as a left side or a left surface.

Further, the first long side LS1, the second long side LS2, the first short side SS1, and the second short side SS2 may be referred to as edges of the display device. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

In embodiments disclosed herein, a direction from the first short side SS1 to the second short side SS2 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

Figure 2:
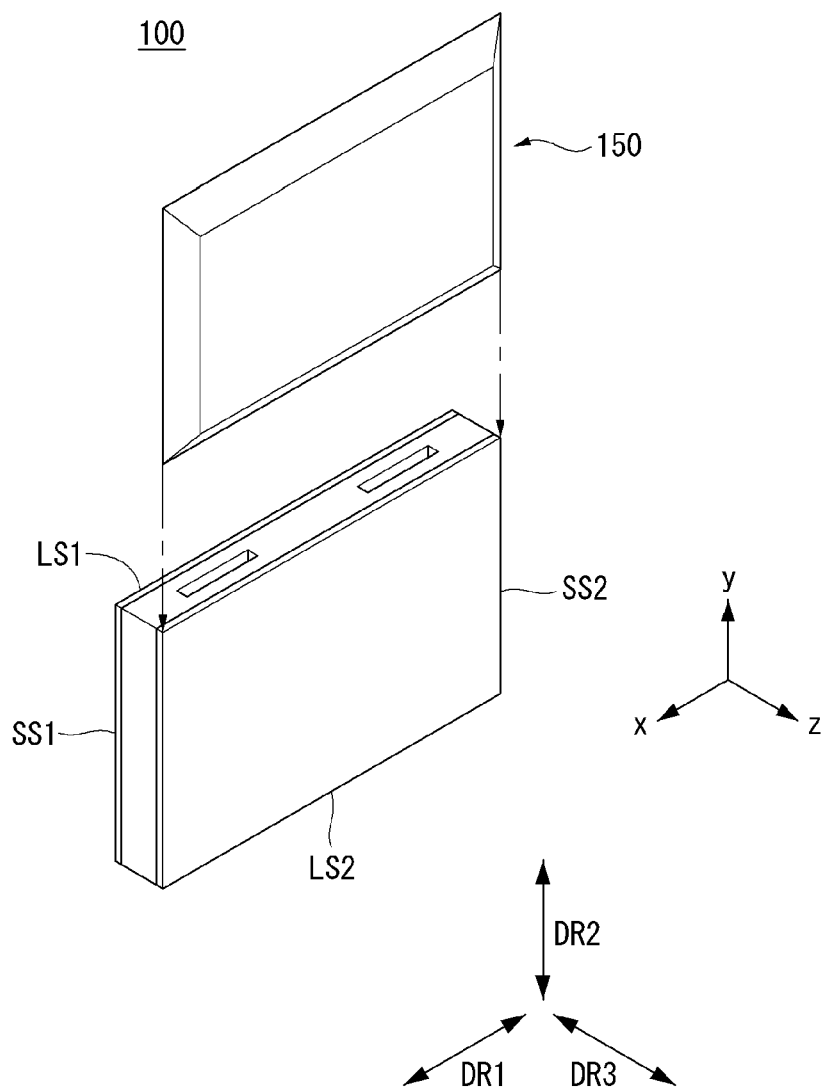

Referring to FIGS. 1 and 2, a display device 100 according to an embodiment of the disclosure may include a display panel 110 and a back cover 150 in the rear of the display panel 110.

The back cover 150 may be coupled with the display panel 110 while sliding in a direction (i.e., the second direction DR2) from the first long side LS1 to the second long side LS2. In other words, the back cover 150 may be inserted into the display panel 110 while sliding from a first short side SS1, a second short side SS2 opposite the first short side SS1, and a first long side LS1 which is adjacent to the first and second short sides SS1 and SS2 and is positioned between the first short side SS1 and the second short side SS2, in the display panel 110.

The back cover 150 and/or other components adjacent to the back cover 150 may include a protrusion, a sliding portion, a coupling portion, etc., so that the back cover 150 is connected to the display panel 110 in the sliding manner.

Figure 3:
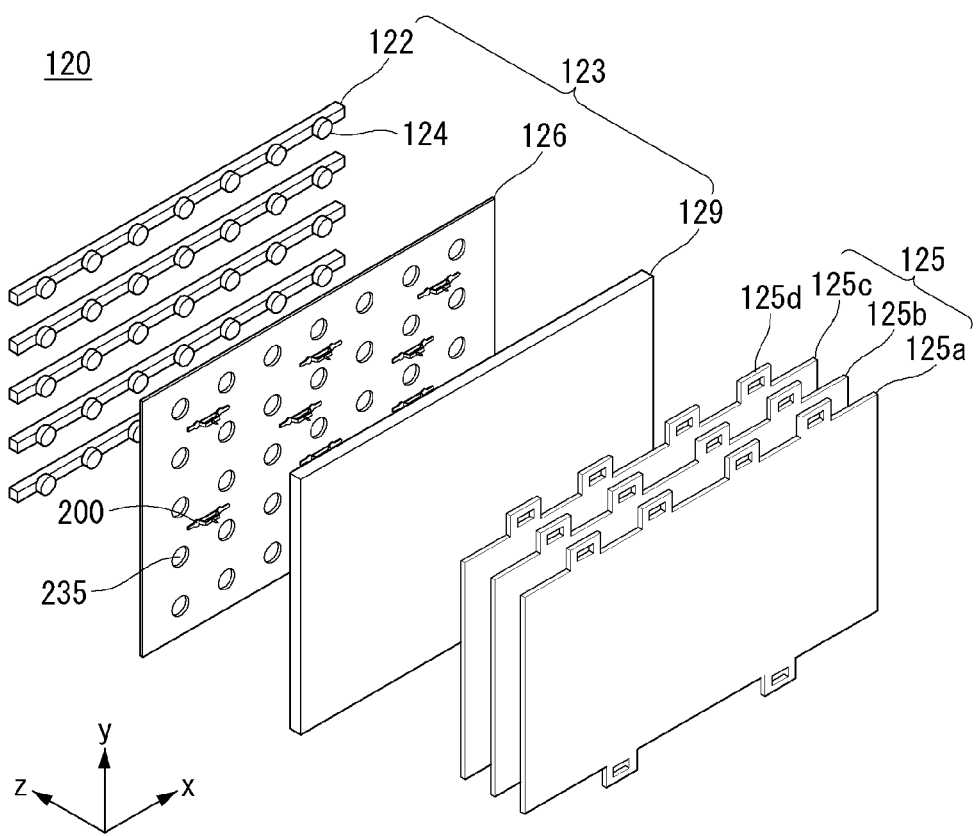

Referring to FIG. 3, a backlight unit 120 may include a substrate 122, at least one light assembly 124, optical layers 123 including a reflecting sheet 126 and a diffusion plate 129, and an optical sheet 125 positioned on front surfaces of the optical layers 123.

The substrate 122 may be configured as a plurality of straps, which is extended in the first direction and is spaced from one another by a predetermined distance in the second direction perpendicular to the first direction.

At least one light assembly 124 may be mounted on the substrate 122. The substrate 122 may have an electrode pattern for connecting an adaptor to the light assembly 124. For example, a carbon nanotube electrode pattern for connecting the adaptor to the light assembly 124 may be formed on the substrate 122.

The substrate 122 may be formed of at least one of polyethylene terephthalate (PET), glass, polycarbonate (PC), and silicon. The substrate 122 may be a printed circuit board (PCB), on which at least one light assembly 124 is mounted.

The light assemblies 124 may be disposed on the substrate 122 at predetermined intervals in the first direction. A diameter of the light assembly 124 may be greater than a width of the substrate 122. Namely, the diameter of the light assembly 124 may be greater than a length of the substrate 122 in the second direction.

The light assembly 124 may be a light emitting diode (LED) chip or a LED package having at least one LED chip. The light assembly 124 may be configured as a colored LED emitting at least one of red, green, and blue light or a white LED. The colored LED may include at least one of a red LED, a green LED, and a blue LED.

The light source included in the light assembly 124 may be a COB (Chip-On-Board) type. The COB light source may have a configuration, in which the LED chip as the light source is directly coupled with the substrate 122. Thus, a process may be simplified. Further, a resistance may be reduced, and a loss of energy resulting from heat may be reduced. Namely, power efficiency of the light assembly 124 may increase. The COB light source can provide the brighter lighting and can be implemented to be thinner and lighter than a related art.

The reflecting sheet 126 may be positioned at the front surface of the substrate 122. The reflecting sheet 126 may be positioned in an area excluding a formation area of the light assemblies 124 of the substrate 122. Namely, the reflecting sheet 126 may have a plurality of holes 235.

The reflecting sheet 126 may reflect light emitted from the light assembly 124 to a front surface of the reflecting sheet 126. Further, the reflecting sheet 126 may again reflect light reflected from the diffusion plate 129.

The reflecting sheet 126 may include at least one of metal and metal oxide each of which is a reflection material. The reflecting sheet 126 may include metal and/or metal oxide having a high reflectance, for example, aluminum (Al), silver (Ag), gold (Au), and titanium dioxide (TiO$_2$).

The reflecting sheet 126 may be formed by depositing and/or coating metal or metal oxide on the substrate 122. An ink including a metal material may be printed on the reflecting sheet 126. A deposition layer may be formed on the reflecting sheet 126 using a heat deposition method, an evaporation method, or a vacuum deposition method such as a sputtering method. A coating layer and/or a printing layer may be formed on the reflecting sheet 126 using a printing method, a gravure coating method or a silk screen method.

An air gap may be positioned between the reflecting sheet 126 and the diffusion plate 129. The air gap may serve as a buffer capable of widely diffusing light emitted from the light assembly 124. A supporter 200 may be positioned between the reflecting sheet 126 and the diffusion plate 129, so as to keep the air gap.

A resin may be deposited on the light assembly 124 and/or the reflecting sheet 126. The resin may function to diffuse light emitted from the light assembly 124. The diffusion plate 129 may upwardly diffuse light emitted from the light assembly 124.

The optical sheet 125 may be positioned at a front surface of the diffusion plate 129. A rear surface of the optical sheet 125 may be adhered to the diffusion plate 129, and a front surface of the optical sheet 125 may be adhered to a rear surface of the display panel 110.

The optical sheet 125 may include at least one sheet. More specifically, the optical sheet 125 may include one or more prism sheets and/or one or more diffusion sheets. The plurality of sheets included in the optical sheet 125 may be attached and/or adhered to one another.

In other words, the optical sheet 125 may include a plurality of sheets having different functions. For example, the optical sheet 125 may include first to third optical sheets 125a to 125c. The first optical sheets 125a may function as a diffusion sheet, and the second and third optical sheets 125b and 125c may function as a prism sheet. A number and/or a position of the diffusion sheets and the prism sheets may be changed. For example, the optical sheet 125 may include the first optical sheets 125a as the diffusion sheet and the second optical sheet 125b as the prism sheet.

The diffusion sheet may prevent light coming from the diffusion plate from being partially concentrated and may further uniformize a diffusion of the light. The prism sheet may concentrate light coming from the diffusion sheet and may allow the concentrated light to be vertically incident on the display panel 110.

A coupling portion 125d may be formed on at least one of corners of the optical sheet 125. The coupling portion 125d may be formed on at least one of the first to third optical sheets 125a to 125c.

The coupling portion 125d may be formed at an edge of the long side of the optical sheet 125. The coupling portion 125d on the first long side and the coupling portion 125d on the second long side may be asymmetric. For example, a number and/or a position of the coupling portions 125d on the first long side may be different from a number and/or a position of the coupling portions 125d on the second long side.

Figure 4:
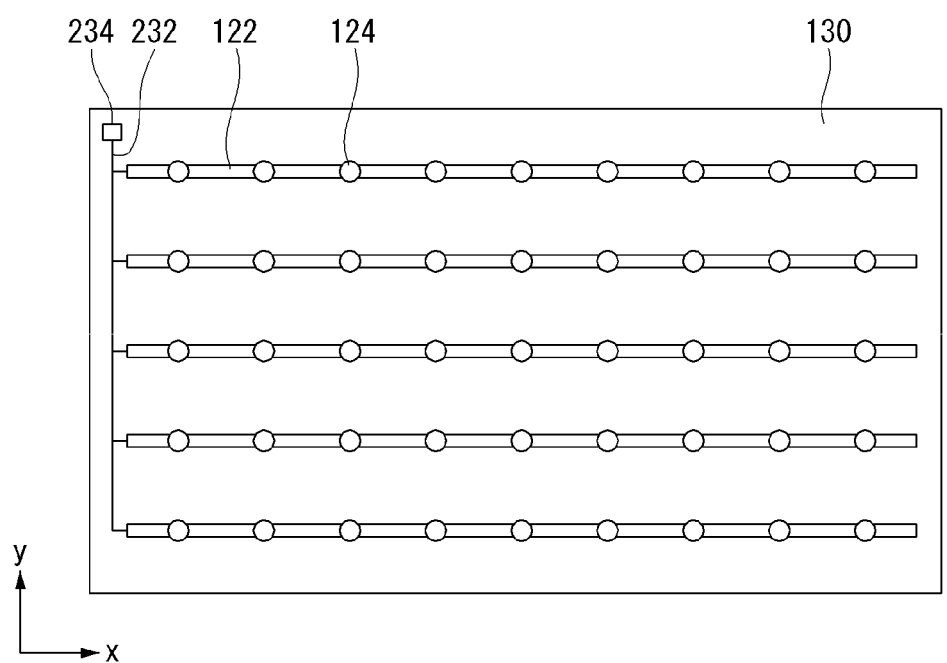

Referring to FIG. 4, the substrate 122 configured as the plurality of straps, which is extended in the first direction and is spaced from one another by a predetermined distance in the second direction perpendicular to the first direction, may be provided on a frame 130. One end of each of the plurality of straps (i.e., the plurality of substrates 122) may be connected to a wire electrode 232.

The wire electrode 232 may be extended in the second direction. The wire electrode 232 may be connected to the ends of the substrates 122 at predetermined intervals in the second direction.

A wire hole 234 may be formed at one end of the wire electrode 232. The wire hole 234 may be a fine hole, through which the frame 130 passes. The wire electrode 232 may be extended to a rear surface of the frame 130 through the wire hole 234. The wire electrode 232 may be electrically connected to an adaptor (not shown) positioned at the rear surface of the frame 130 through the wire hole 234.

The light assemblies 124 may be mounted on the substrate 122 at predetermined intervals in the first direction. A diameter of the light assembly 124 may be greater than a width of the substrate 122 in the second direction. Hence, an outer area of the light assembly 124 may be positioned beyond a formation area of the substrate 122.

Figure 5:
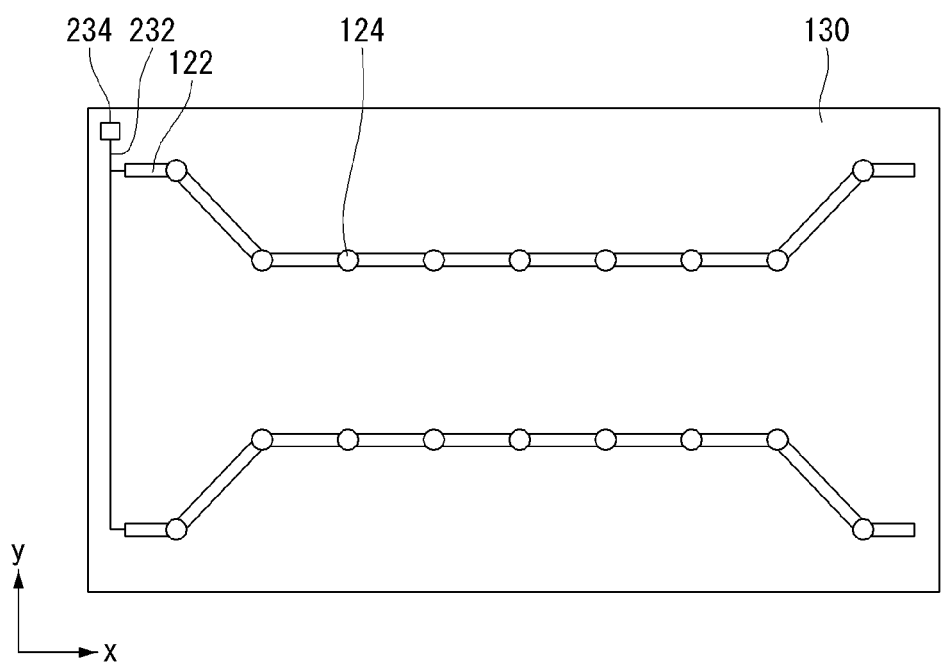

Referring to FIG. 5, both ends of the substrate 122 configured as the plurality of straps may be extended in not the first direction but another direction. Namely, both ends of the substrate 122 may be extended to an edge area of the frame 130, so that the light assembly 124 is positioned in the edge area.

A dark portion of the edge area of the frame 130 can be compensated by disposing the substrate 122, on which the light assemblies 124 are mounted, in the edge area of the frame 130. Namely, the entire area of the display device can uniformly emit light.

One end of the substrate 122 positioned in the edge area may be connected to the wire electrode 232. The wire electrode 232 may be extended in the second direction and may be electrically connected to the adaptor positioned at the rear surface of the frame 130 through the wire hole 234 formed at one end of the wire electrode 232.

Figure 6:
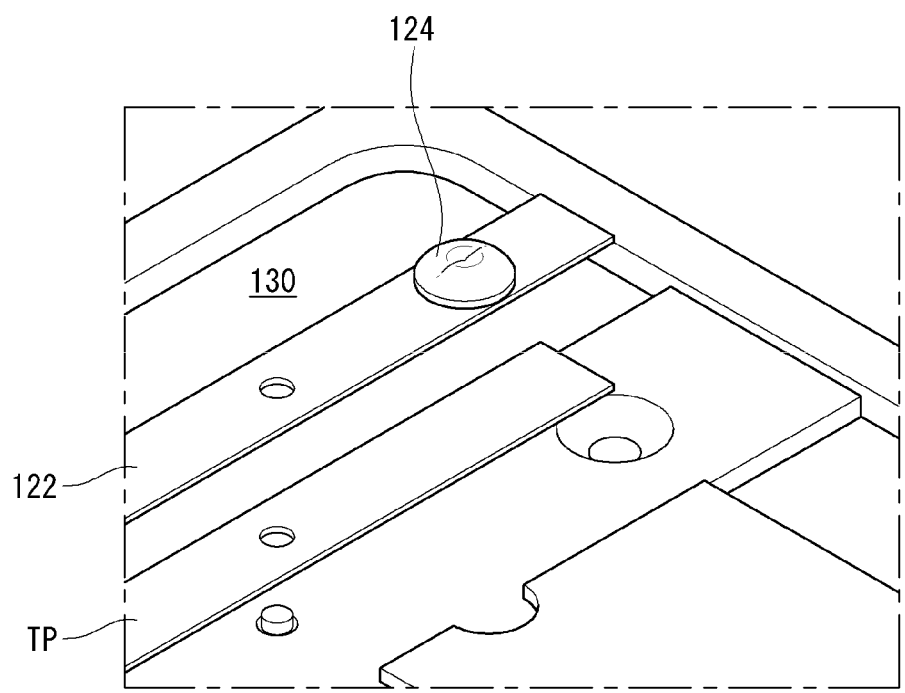

Referring to FIG. 6, the substrate 122 may be coupled with the front surface of the frame 130. The light assemblies 124 may be mounted on the substrate 122. An adhesive member TP may be positioned between the substrate 122 and the front surface of the frame 130. The adhesive member TP may be fixed to the front surface of the frame 130, and the substrate 122 may be fixed to the adhesive member TP. For example, the adhesive member TP may be a double-sided tape.

In this instance, the front surface of the frame 130 may not be flat. The frame 130 may be pressed, so that the components of the display device 100 are safely placed or necessary rigidity is provided for the display device 100. Hence, the front surface of the frame 130 may not be flat.

Figure 7:
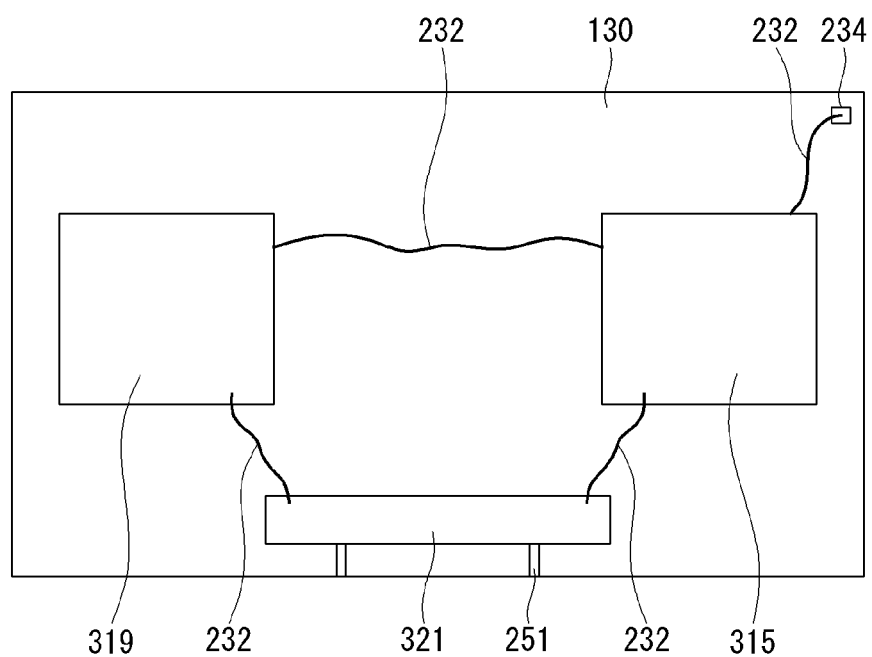

Referring to FIG. 7, the wire electrode 232 extended from the front surface of the frame 130 through the wire hole 234 may be connected to one side of a power supply board 315. The power supply board 315 may be a printed circuit board supplying electric power to the display device 100. The power supply board 315 may convert AC into DC.

The power supply board 315 may cause the light assemblies 124 positioned on the front surface of the frame 130 to emit light through the wire electrode 232. Another side of the power supply board 315 may be connected to a main board 321 through the wire electrode 232. The main board 321 may be spaced from the power supply board 315 by a predetermined distance. For example, the main board 321 may be positioned opposite the power supply board 315 in the second direction with respect to the middle of the frame 130.

The main board 321 may be a printed circuit board providing an interface for operating the display device 100. Further, the main board 321 may check and control an operation state of the components of the display device 100.

The power supply board 315 and the main board 321 may be connected to a timing controller board 319 through the wire electrode 232. The timing controller board 319 may be a printed circuit board transmitting electric power or signals received from the power supply board 315 or the main board 321 to the display panel 110. The timing controller board 319 may be electrically connected to the display panel 110 positioned at the front surface of the frame 130 through flat flexible cables 251.

FIG. 7 illustrates that the printed circuit boards are connected to one another, by way of example. However, embodiments are not limited thereto. For example, only at least a portion of each printed circuit board may be connected to one another.

Figure 8:
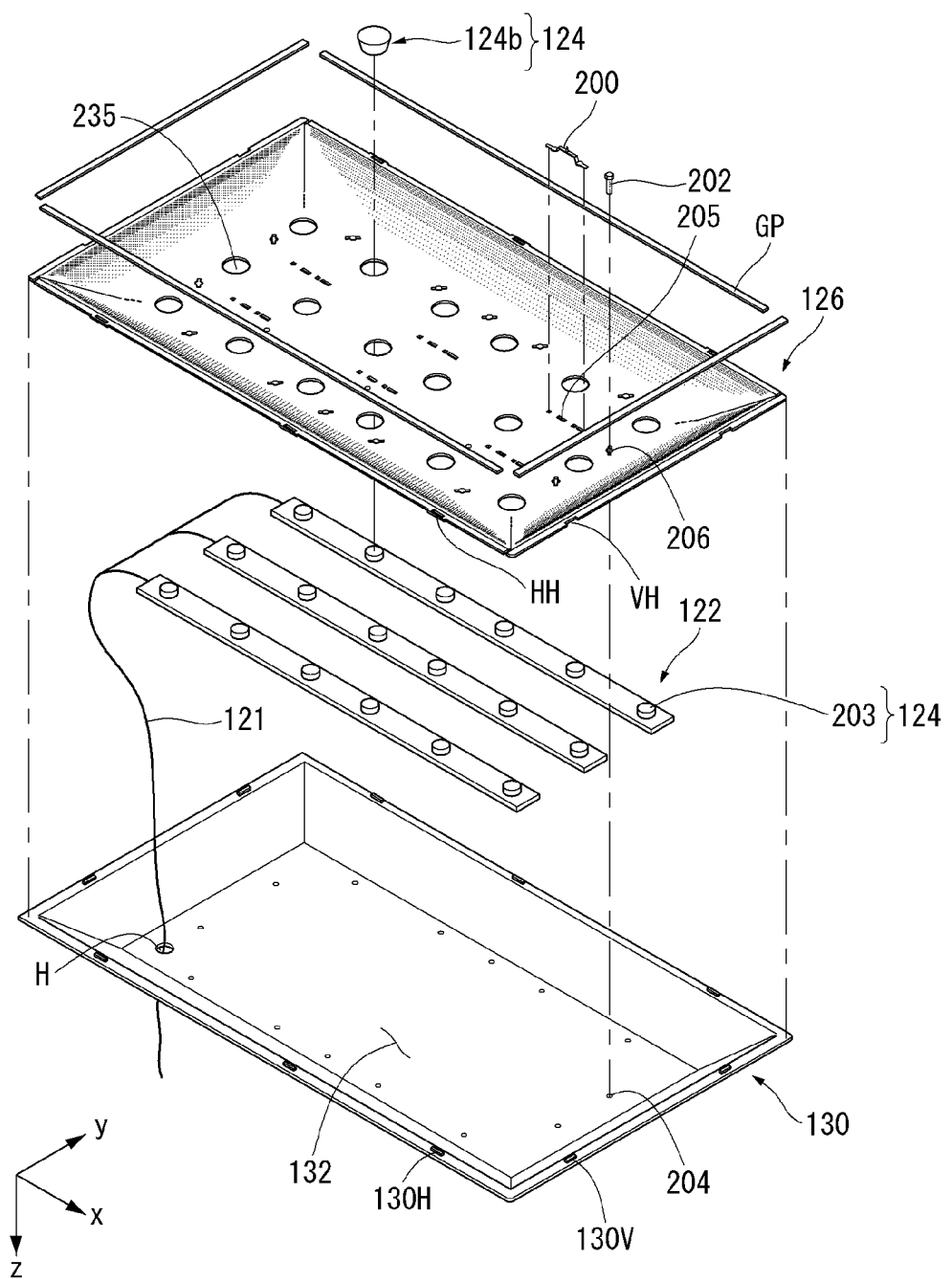

Referring to FIG. 8, the reflective sheet 126 may be coupled to the frame 130. For example, the reflective sheet 126 may be coupled to a receiving portion 132 formed inside the frame 130.

The reflective sheet 126 may include a horizontal coupling portion HH and/or a vertical coupling portion VH. For example, coupling holes may be formed along a long side and/or a short side of the reflective sheet 126.

The horizontal coupling portion HH and/or the vertical coupling portion VH may be inserted into a horizontal protrusion 130H and/or a vertical protrusion 130V formed on the frame 130. A guide panel GP may be coupled to the reflective sheet 126.

The guide panel GP may be formed of a plastic material of injection molding or a metal material that is press-processed. The guide panel GP may be coupled to the horizontal protrusion 130H and/or the vertical protrusion 130V. When the guide panel GP is coupled to the reflective sheet 126, the reflective sheet 126 may be fixed between the frame 30 and the guide panel GP.

The reflective sheet 126 placed on the frame 130 may be configured as a three-dimensional shape corresponding to a shape of the receiving portion 132. The reflective sheet 126 may uniformly reflect light throughout its entire area.

The substrate 122, on which light sources 203 are mounted, may be positioned between the reflective sheet 126 and the frame 130. The plurality of substrates 122 may be arranged in the horizontal direction and/or the vertical direction. The substrates 122 may be connected to signal lines 121 connected to a controller, etc., of the display device 100. The signal lines 121 may be connected to the substrates 122 through holes H formed in the frame 130.

The reflective sheet 126 may include a plurality of lens holes 235. The number of lens holes 235 may correspond to the number of light sources 203 on the substrate 122. The plurality of lens holes 235 may be arranged corresponding to the light sources 203 in the horizontal direction and/or the vertical direction. A lens 124b may be inserted into the lens hole 235.

The reflective sheet 126 may include a plurality of support holes 205. A supporter 200 may be coupled to the support hole 205. The supporter 200 may support the optical sheet 125 and/or the diffusion plate 129 positioned in front of the reflective sheet 126. The reflective sheet 126 may be spaced from the optical sheet 125 and/or the diffusion plate 129 by a predetermined distance.

The reflective sheet 126 may include a plurality of fixing pin holes 206. A fixing pin 202 may be coupled to the fixing pin hole 206. The fixing pin 202 may be coupled to a frame hole 204 formed in the frame 130. Thus, the fixing pin 202 may fix the reflective sheet 126 to the frame 130.

Figure 9:
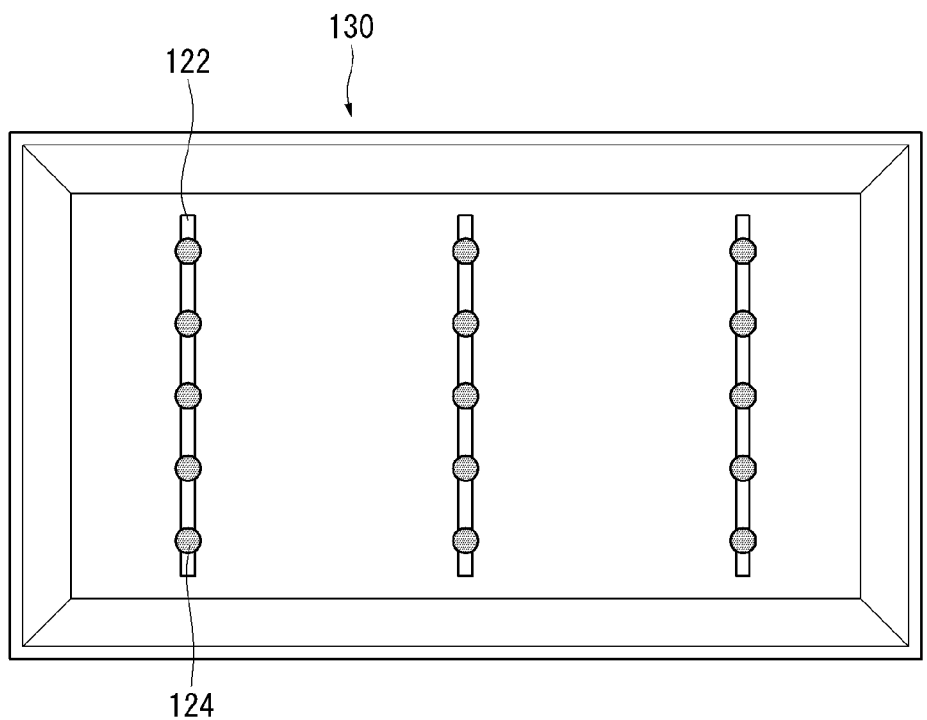
FIG. 9 illustrates an example of disposition of a substrate and a light assembly according to an embodiment of the disclosure.

Referring to FIG. 9, the substrate 122 including the light assemblies 124 may be disposed on the frame 130 in the vertical direction. The plurality of substrates 122 may be disposed on the frame 130 in the vertical direction. The plurality of light assemblies 124 may be sequentially arranged from an upper end to a lower end of the substrate 122. The light assembly 124 may include a light source S (see FIG. 12) and a lens 1240 (see FIG. 10). For example, the light source S may be a white LED, and the lens 1240 may be a refractive lens or a reflective lens.

Figure 10:
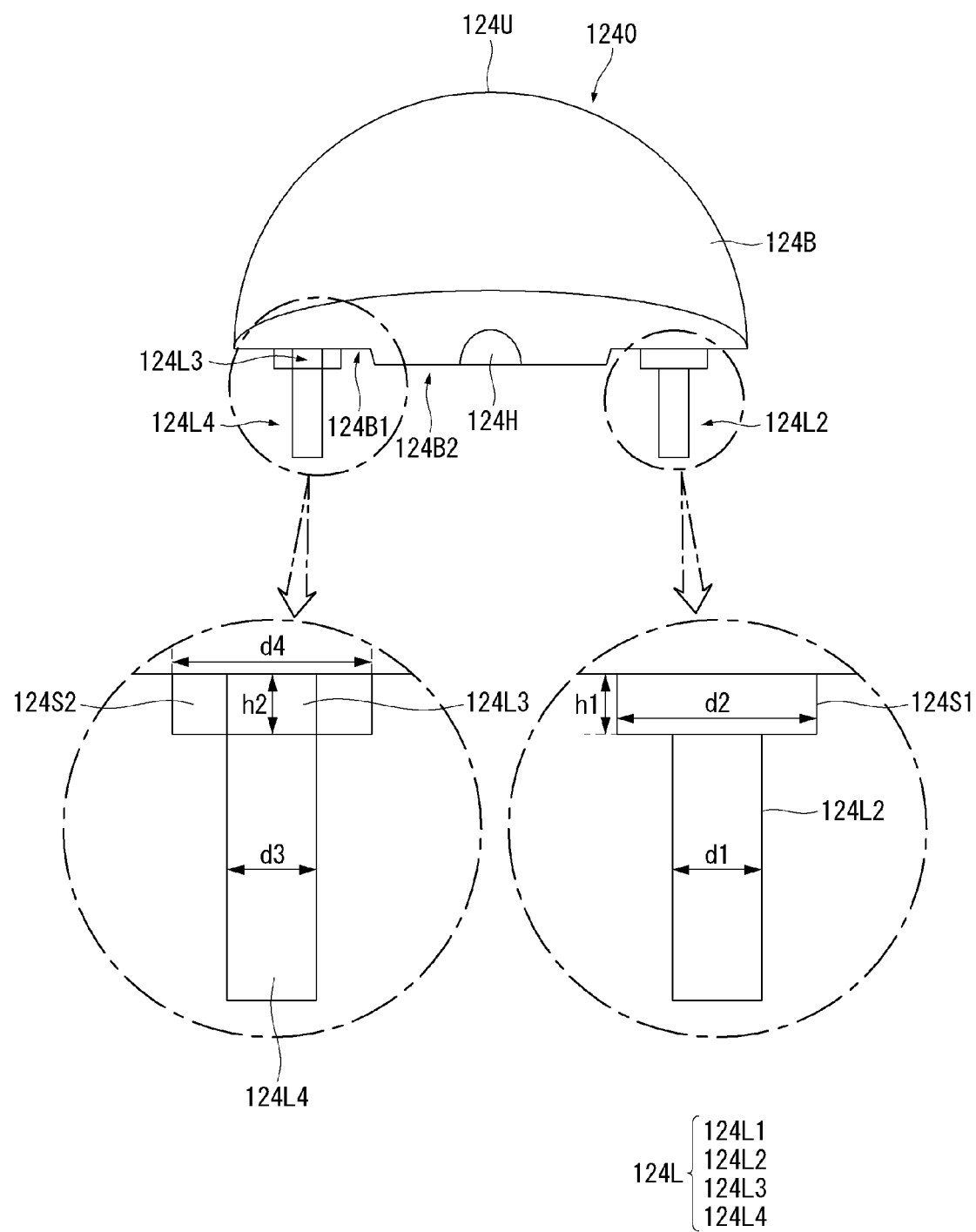
FIGS. 10 and 11 illustrate examples of a lens according to an embodiment of the disclosure.
Figure 11:
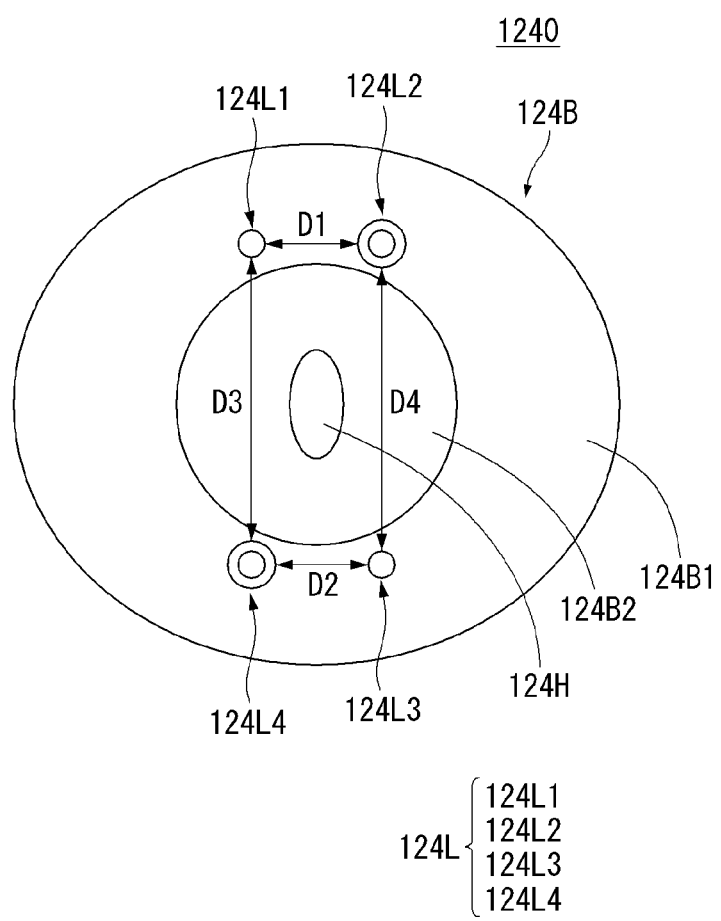

Referring to FIGS. 10 and 11, the lens 1240 may include a body 124B and legs 124L1, 124L2, 124L3, and 124L4. An upper surface 124U of the body 124B may have a dome shape. A lower surface of the lens 1240 may be entirely flat, and a circular or ring-shaped stepped portion may be formed on the lower surface of the lens 1240.

The lens 1240 may include a first lower surface 124B1, a second lower surface 124B2, and a receiving portion 124H. The first lower surface 124B1 may have a ring shape and may form an outermost side of the lower surface of the lens 1240. The second lower surface 124B2 may be formed inside the first lower surface 124B1 in a ring shape and may form the lower surface of the lens 1240. The receiving portion 124H may be formed inside the second lower surface 124B2 in a circle or oval shape and may form the lower surface of the lens 1240. The first lower surface 124B1 and the second lower surface 124B2 may form a stepped portion. The receiving portion 124H may be concavely recessed. The light source S (see FIG. 12) may be positioned in the receiving portion 124H.

A leg 124L may be positioned on the first lower surface 124B1. The plurality of legs 124L may be used. The plurality of legs 124L may include a first leg 124L1, a second leg 124L2, a third leg 124L3, and a fourth leg 124L4. The first leg 124L1 and the second leg 124L2 may form a pair and may be positioned on the first lower surface 124B1 adjacently to the second lower surface 124B2. The third leg 124L3 and the fourth leg 124L4 may form a pair and may be positioned on the first lower surface 124B1 adjacently to the second lower surface 124B2. The first and second legs 124L1 and 124L2 and the third and fourth legs 124L3 and 124L4 may be positioned opposite each other or may be symmetrical with respect to the receiving portion 124H.

For example, a distance D1 between the first leg 124L1 and the second leg 124L2 may be less than a distance D3 between the first leg 124L1 and the third leg 124L3 or a distance D4 between the second leg 124L2 and the fourth leg 124L4. A distance D2 between the third leg 124L3 and the fourth leg 124L4 may be less than the distance D3 between the first leg 124L1 and the third leg 124L3 or the distance D4 between the second leg 124L2 and the fourth leg 124L4. The distance D1 between the first leg 124L1 and the second leg 124L2 may be equal to the distance D2 between the third leg 124L3 and the fourth leg 124L4.

The second leg 124L2 may include a stopper 124S1. The stopper 124S1 may be formed on an outer circumference of the second leg 124L2. The stopper 124S1 may be formed between the second leg 124L2 and the lower surface of the lens 1240. A diameter d2 of the stopper 124S1 may be greater than a diameter d1 of the second leg 124L2. A height h1 of the stopper 124S1 may be equal to a height of the first leg 124L1.

The fourth leg 124L4 may include a stopper 124S2. The stopper 124S2 may be formed on an outer circumference of the fourth leg 124L4. The stopper 124S2 may be formed between the fourth leg 124L4 and the lower surface of the lens 1240. A diameter d4 of the stopper 124S2 may be greater than a diameter d3 of the fourth leg 124L4. A height h2 of the stopper 124S2 may be equal to a height of the third leg 124L3.

Hence, the lens 1240 may be aligned with the light source S while being mounted on the substrate 122, and can prevent eccentricity of the lens 1240 which may be caused by a tolerance.

Figure 12:
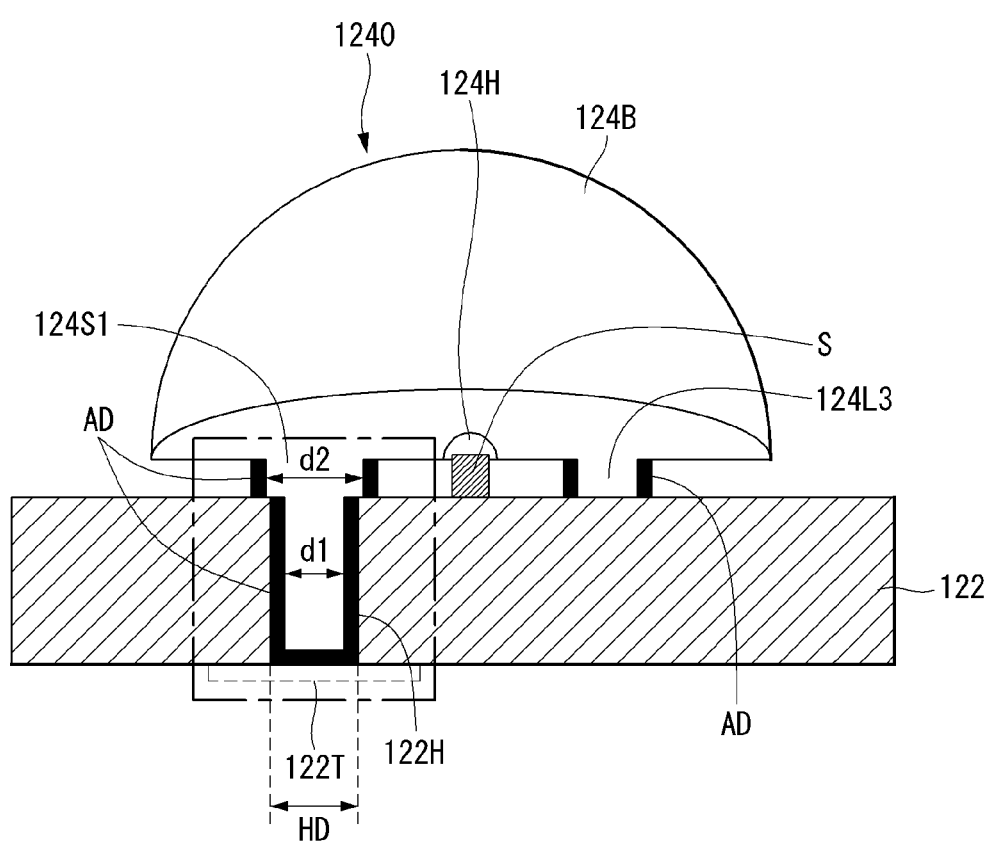
FIGS. 12 to 14 illustrate examples of coupling a substrate and a lens according to an embodiment of the disclosure.
Figure 13:
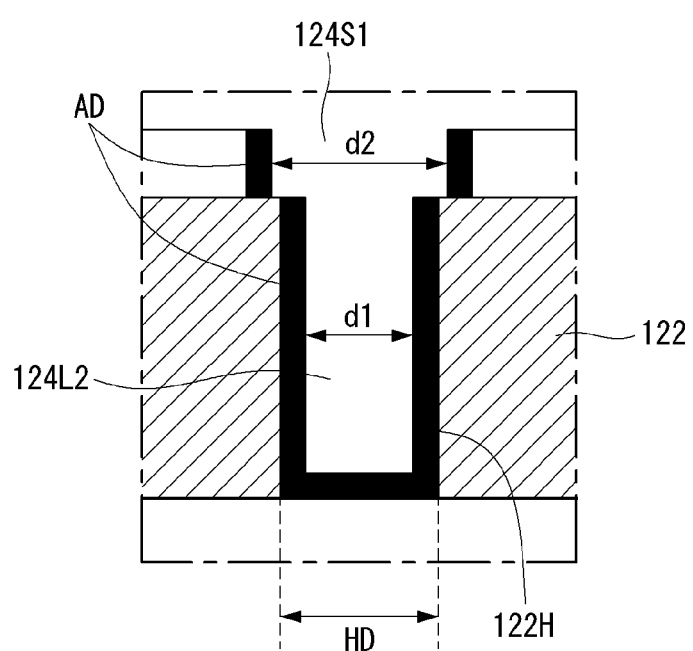

Referring to FIGS. 12 and 13, the substrate 122 may include a hole 122H. The hole 122H may penetrate the substrate 122. For example, the substrate 122 may be a PCB. An adhesive AD may be applied to the hole 122H. For example, the adhesive AD may be a thermosetting epoxy resin. The adhesive AD may be applied to a location of the legs 124L of the lens 1240. After the rear surface of the substrate 122 is processed by a tape 122T, the adhesive AD may be applied to the substrate 122 or the hole 122H of the substrate 122.

The lens 1240 may be mounted on the substrate 122. The second leg 124L2 may be inserted into the hole 122H. As the second leg 124L2 is inserted into the hole 122H, the adhesive AD may fill a gap between the second leg 124L2 and the hole 122H, and also may surround the periphery of the stopper 124S1 and may be cured. The adhesive AD may surround the periphery of the third leg 124L3 and may be cured. The tape 122T may be removed.

A diameter d1 of the second leg 124L2 may be less than a diameter HD of the hole 122H. A diameter d2 of the stopper 124S1 may be greater than the diameter HD of the hole 122H.

Figure 14:
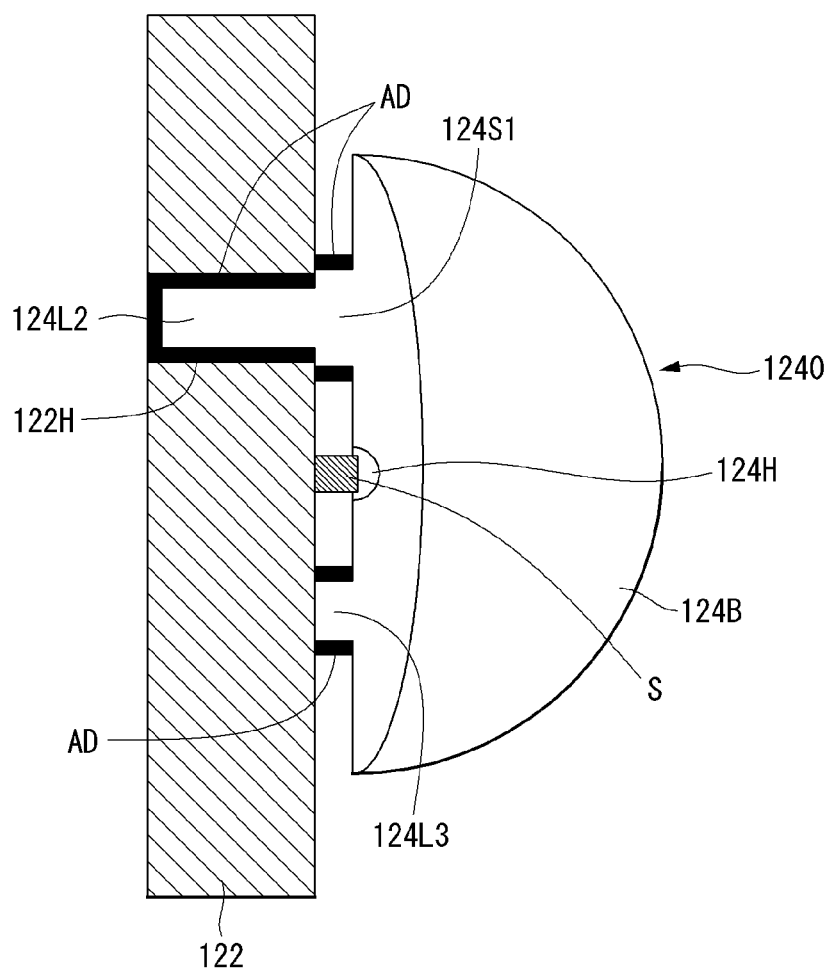

Referring to FIG. 14, the substrate 122 may be disposed in the vertical direction, and the lens 1240 may be fixed to the substrate 122. After the adhesive AD is cured, an adhesive strength of the adhesive AD may be reduced. A reduction in the adhesive strength may be caused by change in a temperature, an external impact, etc. The lens 1240 can remain fixed to the substrate 122 even if the adhesive strength of the adhesive AD is reduced.

Figure 15:
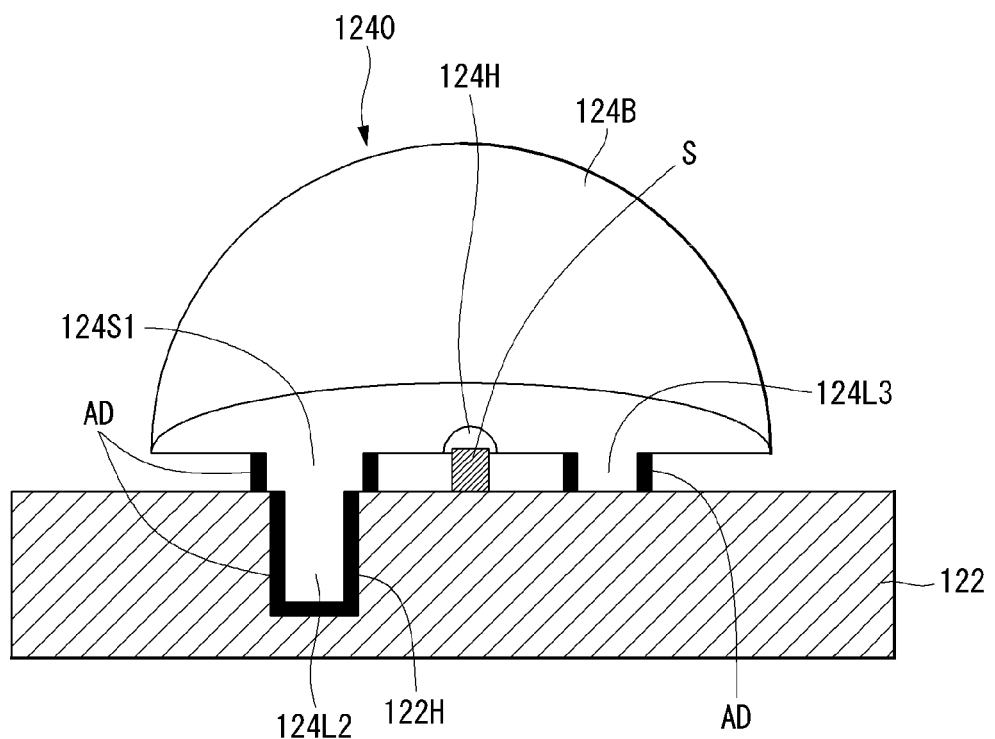
FIGS. 15 to 23 illustrate other examples of coupling a substrate and a lens according to an embodiment of the disclosure.

Referring to FIG. 15, the substrate 122 may include a hole 122H. An upper side of the hole 122H may be opened, and a lower side of the hole 122H may be closed. An adhesive AD may be applied to the hole 122H. The lens 1240 may be mounted on the substrate 122. The second leg 124L2 may be inserted into the hole 122H. As the second leg 124L2 is inserted into the hole 122H, the adhesive AD may fill a gap between the second leg 124L2 and the hole 122H, and also may surround the periphery of the stopper 124S1 and may be cured. The adhesive AD may surround the periphery of the third leg 124L3 and may be cured. The diameter of the second leg 124L2 may be less than a diameter of the hole 122H. The diameter of the stopper 124S1 may be greater than the diameter of the hole 122H.

Figure 16:
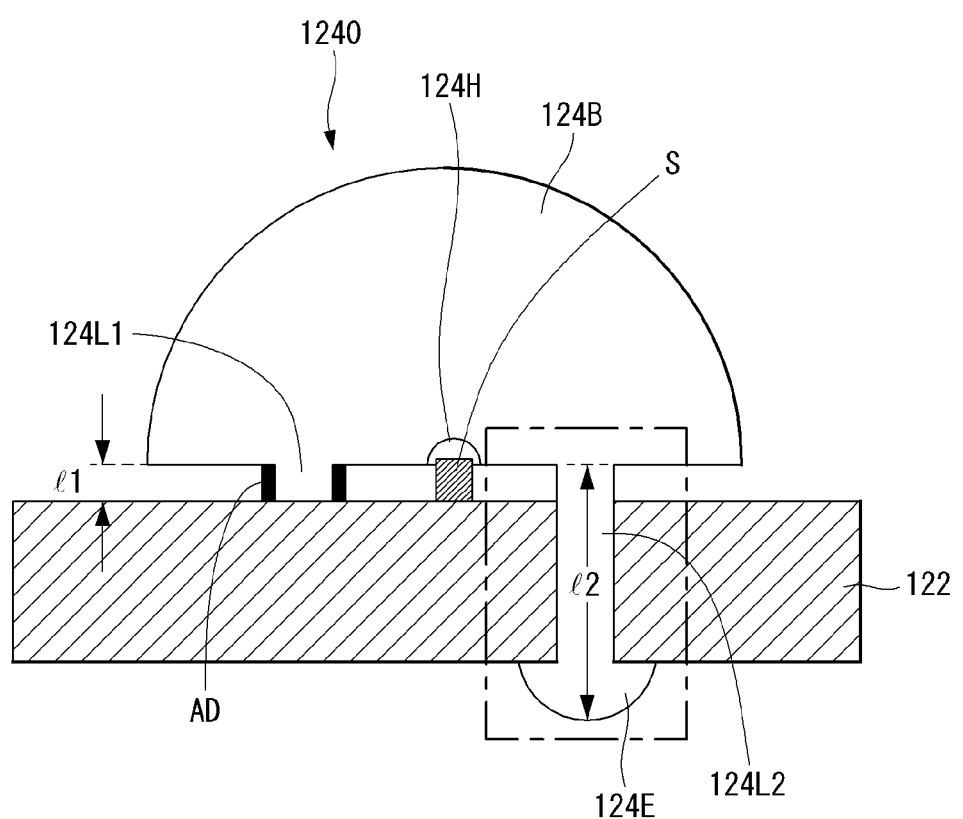
Figure 17:
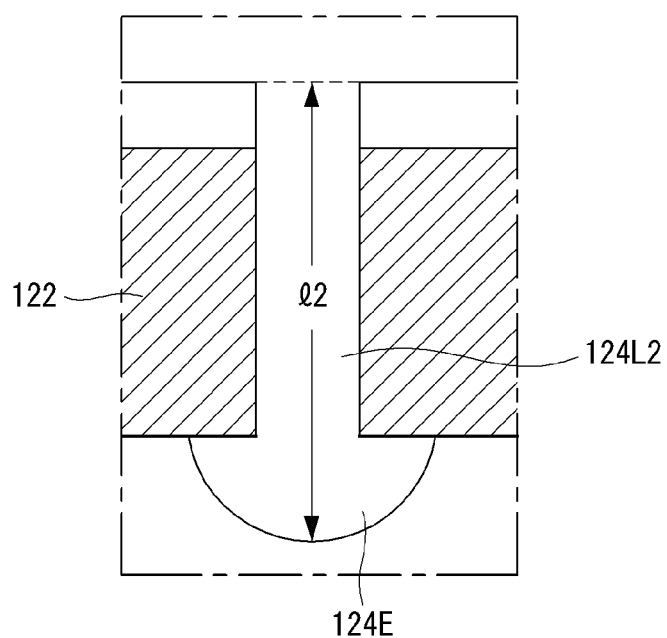

Referring to FIGS. 16 and 17, the lens 1240 may include a first leg 124L1 and a second leg 124L2. A length 12 of the second leg 124L2 may be greater than a length 11 of the first leg 124L1. The length 12 of the second leg 124L2 may be greater than a sum of the length 11 of the first leg 124L1 and a thickness of the substrate 122.

An end 124E of the second leg 124L2 may protrude to the rear surface of the substrate 122. Heat may be applied to the end 124E of the second leg 124L2 protruding to the rear surface of the substrate 122, and the end 124E of the second leg 124L2 may be fused and attached to the rear surface of the substrate 122. The adhesive AD may be formed on the perimeter of the first leg 124L1. Hence, the lens 1240 can be firmly fixed to the substrate 122 even if an adhesive strength of the adhesive AD is reduced.

Figure 18:
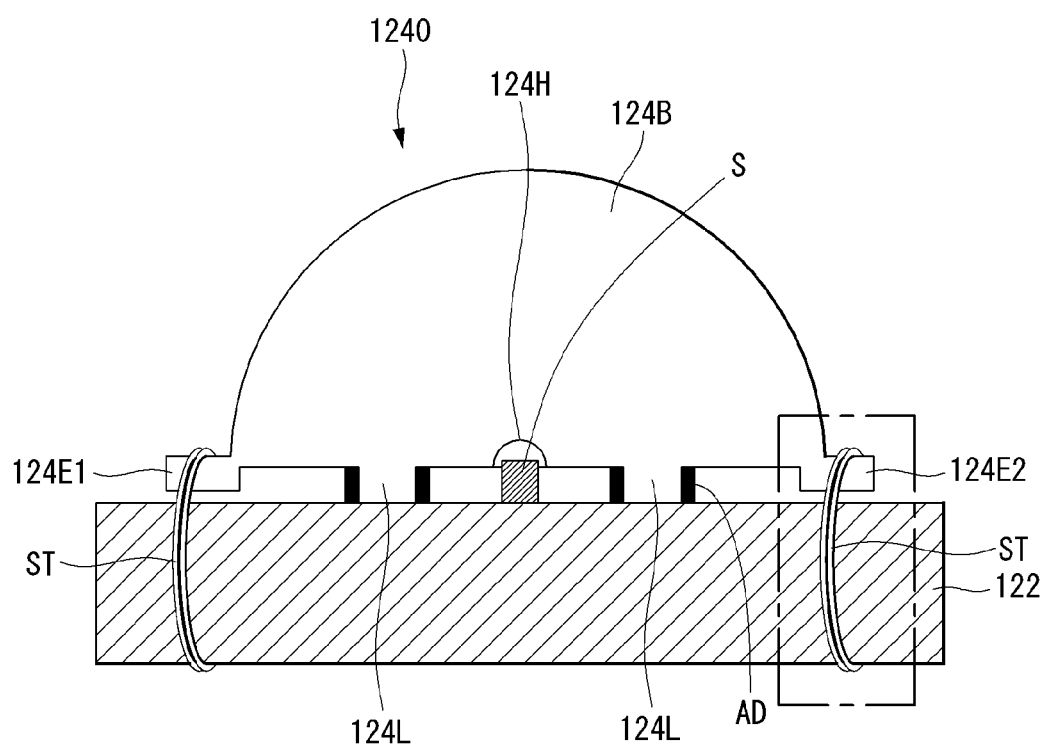
Figure 19:
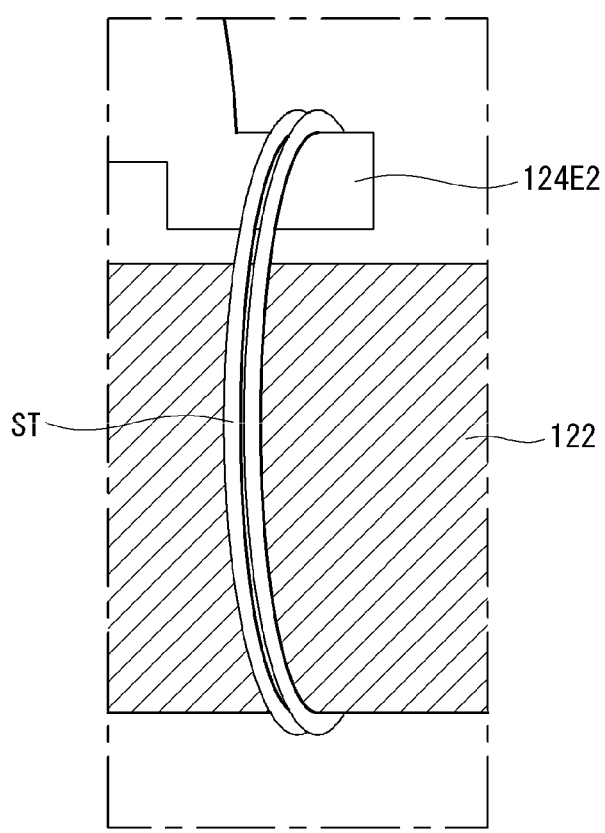

Referring to FIGS. 18 and 19, the lens 1240 may include protrusions 124E1 and 124E2 at both ends of the body 124B. The plurality of protrusions 124E1 and 124E2 may be intermittently formed at lower ends of both sides of the body 124B. A strap ST may bind the substrate 122 to the protrusions 124E1 and 124E2. The adhesive AD may be formed on the perimeter of the leg 124L of the lens 1240. Hence, the lens 1240 can be firmly fixed to the substrate 122 even if an adhesive strength of the adhesive AD is reduced.

Figure 20:
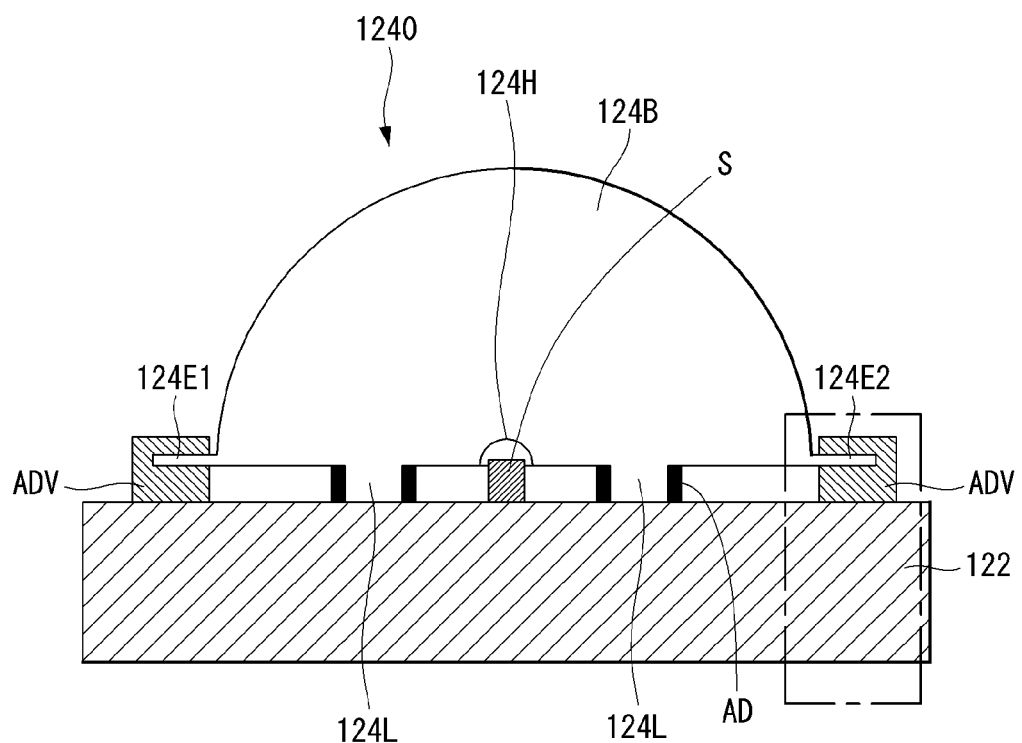
Figure 21:
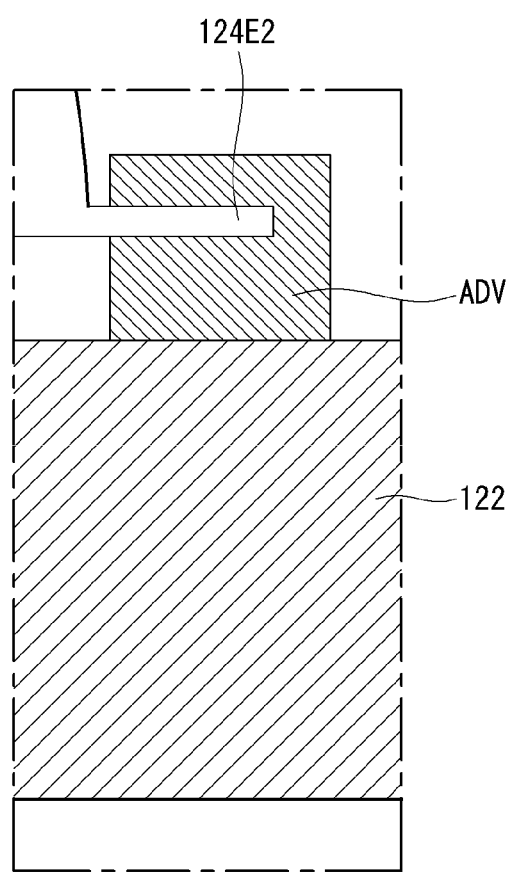

Referring to FIGS. 20 and 21, the lens 1240 may include protrusions 124E1 and 124E2 at both ends of the body 124B. The plurality of protrusions 124E1 and 124E2 may be intermittently formed at lower ends of both sides of the body 124B. The protrusions 124E1 and 124E2 may continuously form a circle around the lower end of the body 124B. The protrusions 124E1 and 124E2 may be bonded (indicated by "ADV" in FIGS. 20 and 21) to the upper surface of the substrate 122. For example, the bonding ADV may cure an epoxy resin through ultraviolet light. The adhesive AD may be formed on the perimeter of the leg 124L of the lens 1240. Hence, the lens 1240 can be firmly fixed to the substrate 122 even if an adhesive strength of the adhesive AD is reduced.

Figure 22:
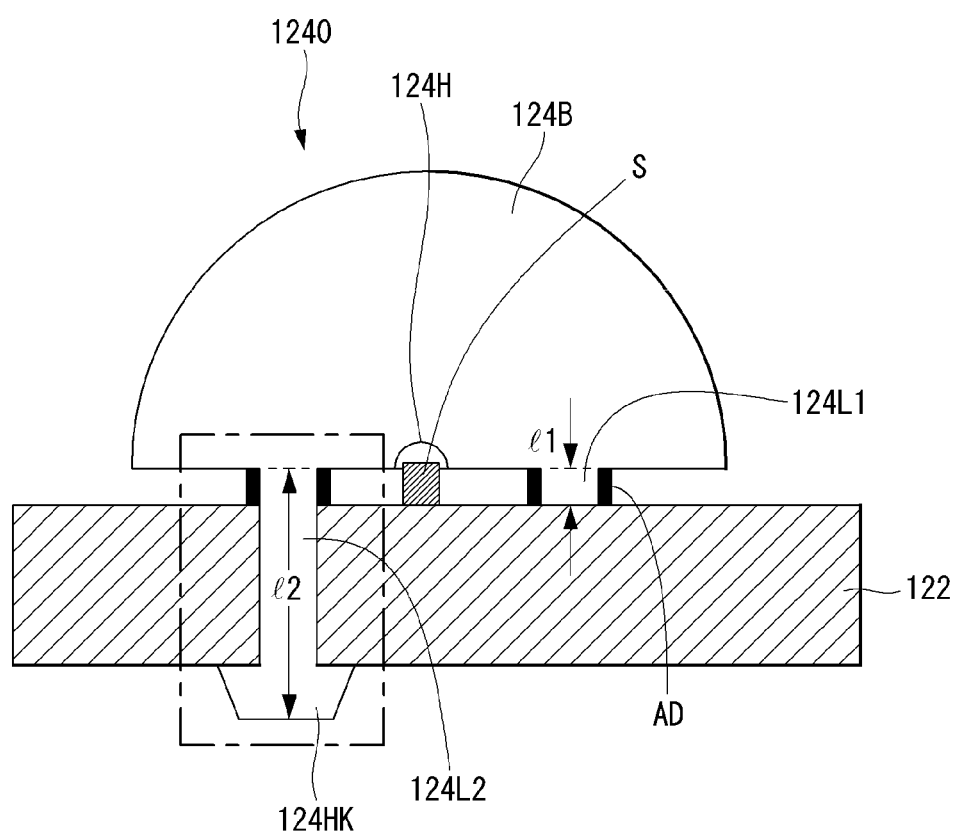
Figure 23:
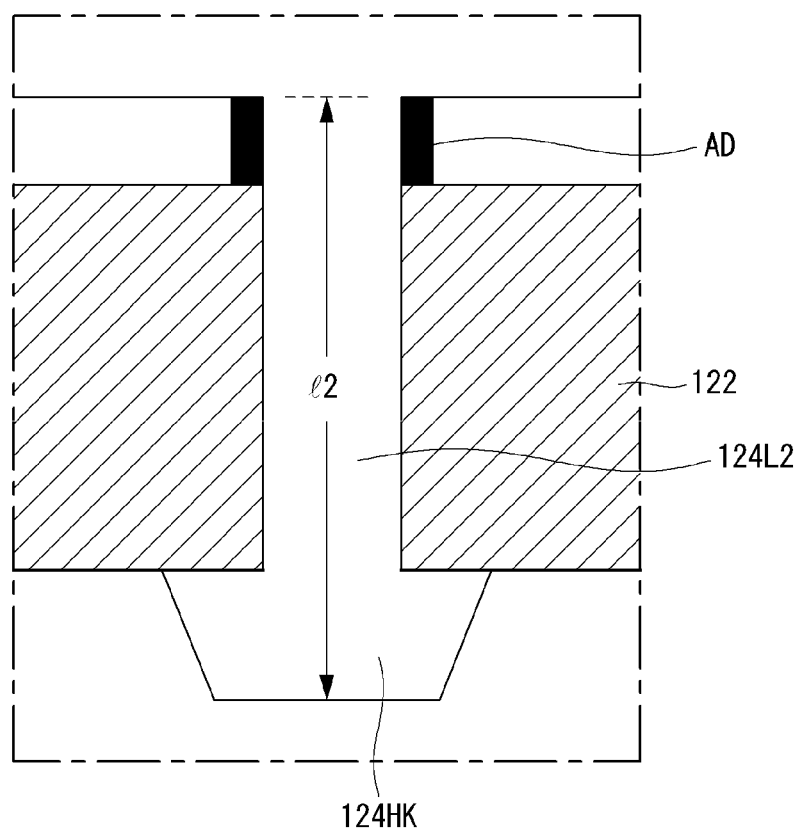

Referring to FIGS. 22 and 23, the lens 1240 may include a first leg 124L1 and a second leg 124L2. A length 12 of the second leg 124L2 may be greater than a length 11 of the first leg 124L1. The length 12 of the second leg 124L2 may be greater than a sum of the length 11 of the first leg 124L1 and the thickness of the substrate 122.

The second leg 124L2 may include a hook 124HK at one end. The hook 124HK of the second leg 124L2 protruding to the rear surface of the substrate 122 may be forced to be inserted and may be fixed to the rear surface of the substrate 122. The adhesive AD may be formed on the perimeters of the first leg 124L1 and the second leg 124L2. Hence, the lens 1240 can be firmly fixed to the substrate 122 even if an adhesive strength of the adhesive AD is reduced.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a display panel;
   a frame positioned in a rear of the display panel;
   a substrate positioned between the frame and the display panel, extended in an up-down direction of the frame, and mounted on the frame;
   a light source mounted on the substrate; and
   a lens covering the light source and mounted on the substrate,
   wherein the lens includes:
   a first stopper protruding and extending from a lower surface of the lens; and
   a first leg extended from the first stopper toward a lower part of the lens and inserted into a hole of the substrate to fix the lens,
   wherein the first leg is fixed to the hole by an adhesive supplied to the hole,
   wherein the lens further includes a second leg positioned adjacent to the first leg and fixed to a surface of the substrate by the adhesive,
   wherein the first stopper is positioned between the first leg and the surface of the substrate,
   wherein a length of the second leg is substantially equal to a length of the first stopper,
   wherein the lens further includes a third leg and a fourth leg that respectively face the first leg and the second leg with respect to a center of a lower surface of the lens,
   wherein the fourth leg includes a stopper,
   wherein the first leg faces the third leg with respect to the center of the lower surface of the lens,
   wherein the second leg faces the fourth leg with respect to the center of the lower surface of the lens, and
   wherein the first leg, the second leg, the third leg, and the fourth leg entirely form a rectangle and are respectively positioned at corners of the rectangle.

2. The display device of claim 1, wherein a diameter of the first stopper is greater than a diameter of the first leg.

3. The display device of claim 1, wherein a diameter of the first stopper is greater than a diameter of the hole.

4. The display device of claim 1, wherein the adhesive is formed around the first stopper.

5. The display device of claim 1, wherein the adhesive supplied to the hole is formed around the second leg.

6. The display device of claim 1, wherein the lens further includes:
- a receiving groove formed at a center of the lens and accommodating the light source;
- a first lower surface formed on a perimeter of the receiving groove; and
- a second lower surface formed on a perimeter of the first lower surface, and
- wherein the first lower surface and the second lower surface form a stepped portion.

7. The display device of claim 6, wherein the first stopper and the first leg are formed on the second lower surface of the lens.

\* \* \* \* \*